United States Patent

[11] 3,582,032

| [72] | Inventor | Eugene W. Placek |
| | | Parma, Ohio |
| [21] | Appl. No. | 766,096 |
| [22] | Filed | Oct. 9, 1968 |
| [45] | Patented | June 1, 1971 |
| [73] | Assignee | Allied Industries, Inc. |
| | | Akron, Ohio |

[54] BREAKAWAY SUSPENSION DEVICE
1 Claim, 6 Drawing Figs.

[52] U.S. Cl.................................................. 248/317,
85/9, 85/62, 89/1.5
[51] Int. Cl........................................................ F16b 31/00
[50] Field of Search............................................ 248/317;
85/61, 62, 9, 7, 8.8; 52/98, 99; 287/131, 135;
24/201 TR, ; 89/1.01, 1.5

[56] References Cited
UNITED STATES PATENTS

| 1,264,251 | 4/1918 | Zavarkin .................. | 85/9 |
| 1,473,910 | 11/1923 | Lambert ..................... | 85/61 |
| 2,036,953 | 4/1936 | Morris ........................... | 24/115.6 |
| 2,085,074 | 6/1937 | Boyles .......................... | 85/61 |
| 2,273,772 | 2/1942 | Pollitz .......................... | 85/62 |
| 2,382,291 | 8/1945 | Carlberg ....................... | 287/135 |
| 2,839,809 | 6/1958 | Warner et al. ............... | 85/7 |
| 3,119,298 | 1/1964 | Brown .......................... | 85/EXP. |
| 3,298,273 | 1/1967 | McKelvey ................... | 85/62 |
| 3,309,961 | 3/1967 | Lee .............................. | 89/1.01 |
| 3,347,293 | 10/1967 | Clark ............................ | 85/8.8 |

Primary Examiner—Marion Parsons, Jr.
Attorney—Hamilton, Cook, Renner & Kenner

ABSTRACT: A breakaway suspension device for the joinder and controlled separation of two objects having a receiver member attached to one of the objects and provided with one or more through bores, a connector member having a bail portion adapted to engage the other of said objects and having a shank portion extending into the through bore in the base member, and a release member interposed between the shank portion of the connector member and the bores in the receiver member and having predetermined severability.

PATENTED JUN 1 1971
3,582,032
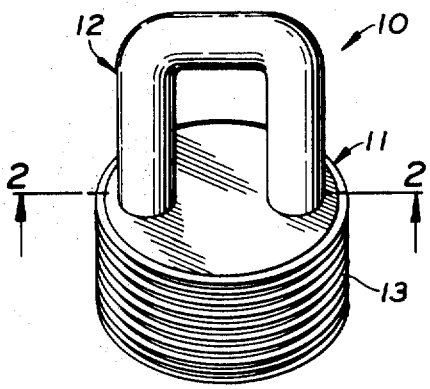
FIG.1
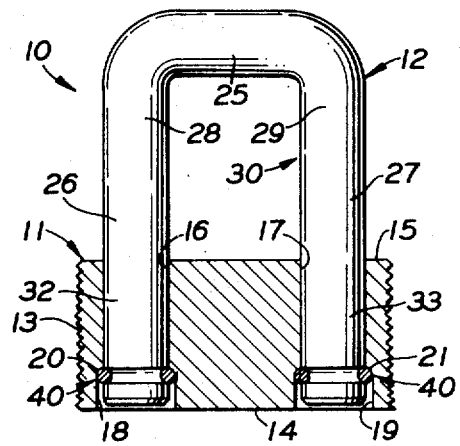
FIG.2
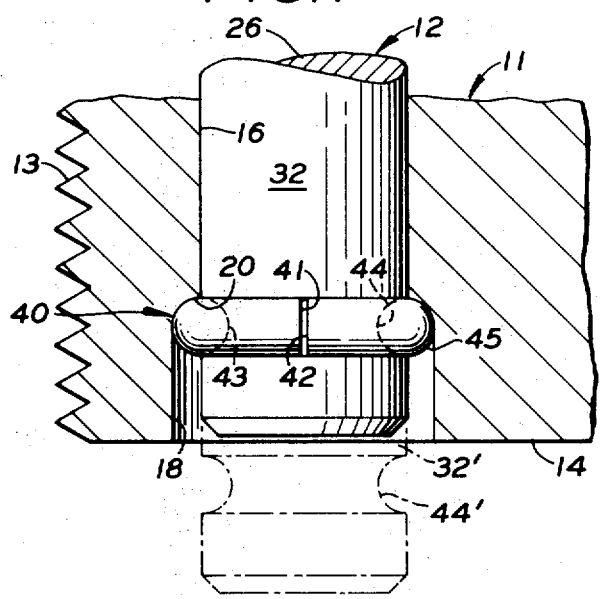
FIG.3
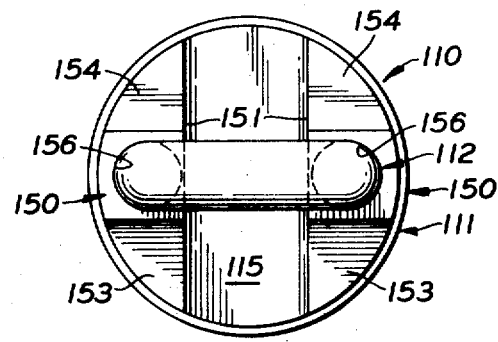
FIG.4
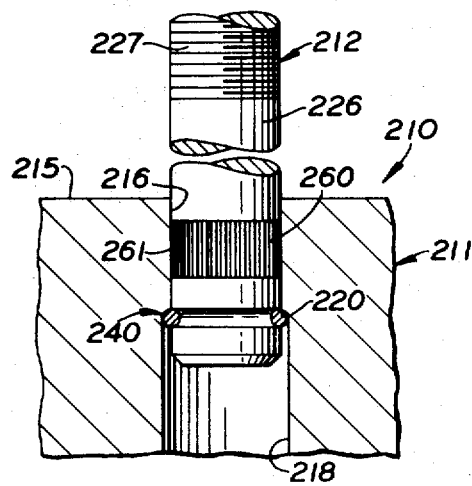
FIG.6
FIG.5
INVENTOR.
EUGENE W. PLACEK
BY Hamilton, Cook,
Renner & Kenner
ATTORNEYS 3,582,032

BREAKAWAY SUSPENSION DEVICE

BACKGROUND OF THE INVENTION

The present invention relates generally to suspension devices for holding and selectively releasing an object upon the application of a predetermined force. More particularly, the invention relates to a fabricated breakaway suspension device which combines failure of the material at a controlled predetermined loading with optimum weight and size considerations.

Breakaway suspension devices may be considered to include components which normally connect a plurality of objects, but, upon the application of a force exceeding a predetermined value, undergo a failure of the material in one or more areas. These devices take a variety of forms depending upon the nature of the associated objects and other environmental factors. One example of the employment of this type of device is in the suspension of bombs in certain types of aircraft. In this application, the device connects to a movable release mechanism which provides support during transit and is actuated to effect release at the appropriate time. Since the release mechanism may jam or otherwise hang up and preclude release of the bomb and since landing an aircraft with live bombs presents substantial risk, the breakaway suspension device is provided so that release of the bombs can be accomplished by application of sufficient force to cause a failure of the material, as by a dive bombing maneuver within the safe operating characteristics of the aircraft.

Breakaway suspension devices used to restrain aircraft bombs are often constituted as a single integral forged unit adapted to connect to the bomb and the movable release mechanism. The tensile strength and other physical properties of a forged part are difficult to make sufficiently uniform so as to provide controlled failure of the material. A primary factor influencing uniformity is the configuration of the part as affected by considerations such as the size of radii and fillets, the magnitude of draft angles, and the "grain flow" in the finished parts as affected by inclusions in and the chemical composition of the metal. Therefore, forged parts of this nature with predictable fail points are difficult to manufacture at realisitic design and production costs and may be virtually impossible for some part configurations.

SUMMARY OF THE INVENTION

It is therefore an object of the invention to provide a breakaway suspension device in which the material will fail within a limited range relative to a preselected loading value, which may be a desired fail point or a normal loading condition plus a suitable safety factor. Another object of the invention is to provide such a device in which the various components have structural characteristics so that the fail point of the material can be readily designed and easily verified. A further object of the invention is to provide a suspension device which can be readily fabricated from standard stock materials.

It is still another object of the invention to provide a breakaway suspension device which can be easily assembled and is readily attached to two or more objects to be controllably restrained. An additional object of the invention is to provide a suspension device which is capable of meeting stringent weight and size limitations. A still further object of the invention is to provide a device which is relatively noncomplex, inexpensive, and maintains its significant characteristics over a long period of time with a minimum of maintenance and upkeep.

In general, a breakaway suspension device according to the concept of the present invention contemplates a base member attached to one of two objects to be joined and a connector member attached to the second of the objects to be joined and having a shank portion normally extending into a bore in the base member and selectively secured therein by a release member designed to undergo a material failure at a predetermined loading condition to provide separation of the base and connector members.

DESCRIPTION OF THE DRAWINGS

FIG. 1 is a perspective view of a breakaway suspension device according to the concept of the present invention in its assembled condition.

FIG. 2 is a section view taken substantially along line 2-2 of FIG. 1 and better showing the assembled interrelation between the receiver connector, and release members.

FIG. 3 is an enlarged fragmentary section showing one shank of the connector member, a portion of the receiver member, and the relation of the release member to these components, including the chain line position for seating the release member on the connector member.

FIG. 4 is a top plan view of a modified form of the breakaway suspension device of FIG. 1 having a reinforced receiver member.

FIG. 5 is a front elevation view of the modified form of FIG. 4 with a portion of the receiver member broken away to show the interrelation with a shank of the connector member.

FIG. 6 is an enlarged fragmentary section view of another modified form of the breakaway suspension device of FIG. 1 having a single shank connector member.

DESCRIPTION OF A PREFERRED EMBODIMENT

Referring to the drawings and particularly to FIG. 1 thereof, the breakaway suspension device, generally indicated by the numeral 10, is particularly adapted to suspend bombs in aircraft. As shown, the breakaway suspension device 10 has a receiver or base, generally indicated by the numeral 11, which may be of generally cylindrical configuration. A connector member, generally indicated by the numeral 12, engages and extends outwardly of the receiver 11. The preferred embodiment contemplates attaching the receiver 11 to an aircraft bomb and the connector member 12 to a removable pin (not shown) or other release device.

As shown, the receiver 11, over at least a portion of its periphery, has a threaded portion 13 adapted to engage mating threads on a bomb or other object (not shown) to be releasably restrained. The threaded portion 13 is designed according to known criteria to fail only at values in excess of a predetermined minimum and bears a specific relation to the fail point of other components are more fully explained hereinafter.

Referring additionally to FIGS. 2 and 3 for further details, the receiver 11 may have an inward end surface 14 disposed within an object to be restrained when the threaded portion 13 is engaged. The receiver 11 has an outward end surface 15 which is positioned on the opposite side of threaded portion 13 from end surface 14 and may be in a plane substantially parallel thereto for ease of fabrication. Extending from the outward end surface 15, a pair of spaced bores 16 and 17 penetrate the receiver 11 and are preferably substantially aligned with the longitudinal axis thereof. The bores 16 and 17 terminate in enlarged counterbores 18 and 19, respectively, emanating from the inward end surface 14, thereby forming shoulders 20 and 21, respectively, which may preferably be somewhat curved within receiver 11.

The connector member 12, as shown, may be of generally U-shaped configuration to engage the bores 16 and 17, thereby preventing rotation with respect to the receiver 11. Initially, the connector member 12 has a curvilinear portion 25 which spaces and joins two shank portions 26 and 27. The curvilinear portion 25 combines with adjacent shank portions 28 and 29 to form a bail configuration, generally indicated by the numeral 30. Although the bail 30 could take a semicircular, rectangular or other shape, the disclosed form is advantageous in terms of accommodating conventional bomb release pins and fabricating a part having substantially uniform physical characteristics by employing conventional metal bar stock with suitable heat treating after machining and forming.

The shank portions 26, 27 of connector member 12 have extremities 32 and 33 which are adapted to matingly engage the bores 16, 17 of receiver 11. The shank portions 26, 27 should be of sufficient length to allow extension through the receiver 11 with some remaining clearance between the curvilinear portion 25 and the outward end surface 15 for purposes of assembly as more fully described hereinafter.

The selective joinder and separation of receiver 11 and connector 12 are effected by release members, generally indicated by the numeral 40, engaging each of shank extensions 32, 33. As shown, each release member 40 may be of generally annular form and may have a substantially circular cross section. For ease of installation, each release member 40 may advantageously be a split retaining ring having adjacent ends 41 and 42 (FIG. 3); in some instances, depending upon the configuration and composition of the components, a two-piece ring may be more appropriate. The release members 40 have an inner surface 43 which seat in mating grooves 44 in the shank extensions 32, 33. The release members 40, when installed on shank extension 32, 33, advantageously have outer surfaces 45 which are of the same or slightly larger diameter than counterbores 18, 19. The preferred form shows the grooves 44 being of semicircular form and of generally the same diameter as the release members 40 as to accommodate approximately half the diameter of the retaining ring. Thus, the bores 16, 17 of receiver 11 at the shoulders 20, 21 are preferably substantially diametrically aligned with the release members 40.

As best seen in FIG. 3, the breakaway suspension device 10 is readily assembled by inserting the shanks 26, 27 into bores 16, 17 of receiver 11 so that the shank extremities 32, 33 extend beyond the inward end surface 14 of receiver 11, as depicted in the chain line position. In this position, the release member 40 may be easily seated in the groove 44' of shank extension 32' and similarly on the other comparably extended shank extension 33. Subsequently, the connector member 12 is moved upwardly (FIGS. 2 and 3) with respect to receiver 11 to the solid line position shown in FIG. 3, where the release member 40 engages the shoulder 20. The receiver 11 and connector member 12 then remain joined under the application of loads tending to pull the shanks 26, 28 out of bores 16, 18 until such time as the release members 40, being compression loaded, fail diametrically in shear. Although a wide variety of steels and other materials are satisfactory for the release member 40, a steel alloyed or coated with phosphorus is particularly well suited for this use for the reason that brittleness is increased and strength under application of sudden shock decreased, thereby tending to produce a sharp, clean break at a predetermined loading value. In order to assure that failure occurs at the desired predetermined loading, the fail point of the receiver threads 13 and the connector member 12 must exceed that of the release members 40.

A modified form of the invention is shown in FIGS. 4 and 5, wherein a reinforced receiver portion is provided. In this embodiment, the breakaway suspension device, generally indicated by the numeral 110 has a receiver, generally indicated by the numeral 111, and a connector member, generally indicated by the numeral 112. The selective joinder and separation of receiver 111 and connector member 112 are effected by a release member, generally indicated by the numeral 140. The structure of the connector member 112 and release member 140 is identical to that disclosed and described above in conjunction with the embodiment of FIGS. 1—3.

The reinforced receiver 111 has an outward end surface 115 with collars 150 projecting outwardly in the direction of shanks 126 and 127 of connector member 111. The collars 150 may be any type of solid member providing support about the periphery of the shanks 126, 127 and can be a single or dual appendages, as shown, so as to provide improved loading characteristics of the receiver 111 when forces are applied to the connector 112 laterally, or with components perpendicular to the shanks 126, 127. The collars 150 shown in FIGS. 4 and 5 are identical and have vertical walls 151 and 152, the latter being curved to conform to the shape of the receiver 111. The collars 150 also have two sides 153 and 154 which may taper upwardly to form at the upper extremities of sides 151, 152 top surfaces 155 which may conveniently be parallel to outward end surface 115. The collars 150 each have a bore 156 to receive the shanks 126, 127 of connector 112, Thus, the collar 150 provides a reinforced receiver which is shaped to avoid interference with any associated components.

In certain applications it may be desirable to provide a connector member employing a single shank communicating with the receiver. Such a modified form of the invention is depicted in FIG. 6 which discloses a breakaway suspension device, generally indicated by the numeral 210, having a receiver, generally indicated by the numeral 211, and a connector member, generally indicated by the numeral 212. The receiver is of the same general configuration and material as the corresponding component disclosed in the FIG. 1—3 embodiment, except that it has a single bore 216 extending from an outward end surface 215 and a single counterbore 218 forming a shoulder 220. The connector member 212 has a single shank 226 with a threaded portion 227, loop, or other device for attachment to one of the objects to be restrained.

The selective joinder and separation of receiver 211 and connector 212 are effected by a release member, generally indicated by the numeral 240, which is of identical structure and operation with the release member 40 disclosed above. Since the connector 212 has only a single shank 226, an additional provision must be made if it is necessary to limit rotation of the connector 212 relative to the receiver 211. As shown, the shank 226 is provided with a splined area 260 which engages mating grooves 261 on the interior surface of bore 216. Depending upon the torsional force which must be withstood, a knurled portion, key, or other rotation limiting device could be employed with equivalent results.

It can be seen that the disclosed apparatus carries out the objects of the invention set forth above. Since various modifications in details, material, and arrangements of parts are within the spirit of the invention herein disclosed and described, the scope of the invention should be limited solely by the scope of the attached claims.

I claim:

1. A breakaway suspension device for joinder and controlled separation of two objects comprising, receiver means attached to one of the objects and having two bores, two counterbores forming shoulders in each of said bores, said receiver means being generally of cylindrical configuration and having a threaded side portion, connector means attached to the other of the objects, shank means on said connector means engaging said bore means, said connector means having a curvilinear portion spacing at least two shanks insertable in said two bores, and a split retaining ring interposed between said receiver means and said connector means, said retaining ring being of a brittle material for predictable failure in shear.